United States Patent
Ong

(10) Patent No.: US 12,025,052 B2
(45) Date of Patent: Jul. 2, 2024

(54) FUEL SOURCE ADAPTER FOR COMBUSTION ENGINES

(71) Applicant: AHO Holdings LLC, Zeeland, MI (US)

(72) Inventor: Andrew Ong, Holland, MI (US)

(73) Assignee: AHO Holdings LLC, Zeeland, MI (US)

( * ) Notice: Subject to any disclaimer, the term of this patent is extended or adjusted under 35 U.S.C. 154(b) by 0 days.

(21) Appl. No.: 17/502,672

(22) Filed: Oct. 15, 2021

(65) Prior Publication Data

US 2022/0120213 A1    Apr. 21, 2022

Related U.S. Application Data

(60) Provisional application No. 63/092,800, filed on Oct. 16, 2020.

(51) Int. Cl.
*F02B 69/02*    (2006.01)
*F02B 63/04*    (2006.01)

(52) U.S. Cl.
CPC ............ *F02B 69/02* (2013.01); *F02B 63/048* (2013.01)

(58) Field of Classification Search
CPC ........ F02B 69/02; F02B 63/048; F02M 37/00
USPC ........................................................ 123/2
See application file for complete search history.

(56) References Cited

U.S. PATENT DOCUMENTS

| | | | | |
|---|---|---|---|---|
| 3,882,838 A | * | 5/1975 | Nutten | F02M 17/04 123/330 |
| 5,370,098 A | * | 12/1994 | Iida | F02D 19/023 123/527 |
| 8,448,924 B2 | | 5/2013 | Keller | |
| 2003/0154962 A1 | * | 8/2003 | Chatfield | F02M 61/145 123/472 |
| 2018/0135563 A1 | * | 5/2018 | Dodman | F02M 35/10 |

* cited by examiner

*Primary Examiner* — Lindsay M Low
*Assistant Examiner* — Omar Morales
(74) *Attorney, Agent, or Firm* — Bodman PLC

(57) ABSTRACT

A system provides a fuel source adapter for a combustion engine. The fuel source adapter is located at least partially between an air intake and the combustion chamber of the engine, such as at the carburetor or throttle body. The combustion chamber receives airflow from the air intake manifold that is delivered through an airflow passage. The fuel source adapter has a spacer plate portion and a velocity stack. The velocity stack extends from the spacer plate to the air intake manifold. An axial airflow passage extends through the velocity stack and the spacer plate. The axial airflow passage is aligned with the airflow passage of the carburetor or throttle body. The spacer plate has a transverse fuel inlet. The transverse fuel inlet extends to the axial airflow passage and enables a fluid connection to the axial airflow passage.

18 Claims, 15 Drawing Sheets
FUEL SOURCE ADAPTER FOR COMBUSTION ENGINES

CROSS-REFERENCE TO RELATED APPLICATION

This application claims priority under 35 U.S.C. § 119(e) to U.S. Provisional Patent Application No. 63/092,800, filed Oct. 16, 2020, the disclosure of this prior application is considered part of this application and is hereby incorporated by reference in its entirety.

TECHNICAL FIELD

The present disclosure relates to fuel systems for combustion engines and devices adapting combustion engines to run on alternate fuel sources.

BACKGROUND

Commercial combustion engines, such as portable generators, are often compatible with only a single, primary fuel source such as gasoline. However, various fuel sources provide differing operational advantages such as fuel economy, lower emissions, and ease of transportation. Accordingly, it can be desirable for a combustion engine to be compatible with one or more alternate fuel sources, such as propane or natural gas.

A combustion engine designed to operate using a primary fuel requires adaptation to operate using an alternate fuel source. Traditional methods of adapting combustion engines to operate using alternative fuels often require irreversible and damaging alterations to the combustion engine. For example, conventional combustion engines often utilize a carburetor with a venturi area forming an air passage and a fuel inlet extending through the carburetor block to the venturi area. However, this fuel inlet is often designed specifically for gasoline combustion and is too small to carry the requisite amount of alternative fuel for optimal engine performance. Thus, permanent modification to enlarge the fuel inlet or to create a secondary inlet is often necessary to convert the engine to operate using an alternative fuel.

SUMMARY

The devices and systems provided in this disclosure relate to adapting a combustion engine's fuel source from a primary fuel, such as gasoline, to an alternative fuel, such as propane or natural gas, without permanently modifying or substantially altering the engine or its related components. Combustion engines, such as those that operate portable generators, do not often have fuel injection systems that require expensive sensors and related components to operate. Instead, these combustion engines typically include a carburetor with a venturi area and a primary fuel inlet with fluid connection to the venturi area and an air intake providing passageway to the venturi area. In some examples, engine compartments on machines such as portable generators also lack empty or adaptable space, such as in the area between the air intake and the carburetor. In some instances, portable generators with fuel injection systems also include air intake passageways to a venture area at a throttle body injector that replaces the carburetor.

To introduce an alternative fuel to a combustion engine without permanently or substantially modifying the carburetor, throttle body, or air intake, a fuel source adapter may be installed between the air intake and the carburetor or throttle body. The fuel source adapter has a velocity stack that extends into the air intake manifold to form an axial airflow passage that is aligned with the airflow passage of the carburetor or throttle body. The fuel source adapter also has a transverse fuel inlet that extends to the axial airflow passage to allow a gaseous fuel to enter the combustion chamber via the carburetor or throttle body through the transverse fuel inlet and axial airflow passage. Thus, the fuel source adapter, such as described and illustrated in the examples herein, minimizes the space needed for such device, while also providing optimized engine performance and eliminating or substantially reducing the need for permanent modification to the engine or machine. In some examples, the fuel source adapter introduces a volume of alternative fuel to the engine that is compatible with its original carburetor and air intake manifold.

According to one aspect of the present disclosure, a system provides an air intake manifold, a combustion chamber, and a fuel source adapter for a combustion engine. The fuel source adapter is located at least partially between the air intake and the combustion chamber, such as having a carburetor or throttle body. The combustion chamber receives an air and fuel mixture through an intake opening forming an airflow passage, and the air intake manifold is configured to deliver airflow to the airflow passage. The fuel source adapter has a spacer plate portion disposed between the air intake manifold and the combustion chamber, such as at the carburetor or throttle body. The fuel source adapter also has a velocity stack that extends from the spacer plate into the air intake manifold. An axial airflow passage extends through the velocity stack and the spacer plate and is aligned with the airflow passage. The spacer plate has a transverse fuel inlet that extends to the axial airflow passage and enables a fluid connection to the axial airflow passage. This allows a gaseous fuel to enter the combustion chamber through the transverse fuel inlet and axial airflow passage.

Implementations of the disclosure may include one or more of the following optional features. In some implementations, the combustion-facing surface has a matching opening surrounding the axial airflow passage. The combustion-facing surface may be configured to couple with the carburetor or throttle body around the airflow passage.

In some examples, the spacer plate and the velocity stack are a single integral piece. The velocity stack may have an interior surface forming a horn-shaped opening. The horn-shaped opening may be aligned with the intake opening forming the axial airflow passage. The velocity stack may at least partially extend into the air intake manifold.

In some implementations, an adjustment insert is engaged with the transverse fuel inlet. In these implementations, the adjustment insert may be configured to enable a fluid connection from the adjustment insert to the transverse fuel inlet. The adjustment insert may also have an interior bore adapted to permit a determined flow of gaseous fluid to pass through the adjustment insert to the fuel inlet.

In some examples, the transverse fuel inlet may have an interior surface at least partially defined by a cylindrical opening extending into the spacer plate. The transverse fuel inlet interior surface may have internal threads. In those implementations, the adjustment insert exterior surface has external threads and the transverse fuel inlet internal threads are configured to engage the adjustment insert external threads.

According to another aspect of the present disclosure, a fuel source adapter for introducing an alternate fuel source to a combustion engine includes a spacer plate. The spacer plate has an intake facing surface, a combustion-facing surface, and a thickness defined by a distance between the intake-facing surface and the combustion-facing surface. An axial airflow passage is surrounded by an interior surface of the spacer plate. The axial airflow passage extends through the thickness of the spacer plate from the intake-facing surface to the combustion-facing surface. The axial airflow passage is configured to align with an intake opening, such as through a carburetor or throttle body. A transverse fuel inlet extends within the thickness of the spacer plate. The transverse fuel inlet extends to the interior surface that defines the axial airflow passage. The transverse fuel inlet is configured to enable fluid connection with the airflow passage. A velocity stack extends from the spacer plate. The velocity stack extends about the perimeter of the axial airflow passage from the intake-facing surface of the spacer plate. The velocity stack extends to a tapered-expanding mouth.

In some implementations, the axial airflow passage is a substantially cylindrical opening through the thickness of the spacer plate. The velocity stack may have an interior surface surrounding a horn-shaped channel that axially aligns with the axial airflow passage. The velocity stack may extend a distance from the spacer plate that is adapted for smoothing airflow.

In some examples, the fuel inlet has an interior surface that at least partially defines an opening with a non-circular cross-sectional shape that extends into the axial airflow passage. In these examples, the fuel source adapter may have a hose fitting configured to engage a fuel hose. The fuel inlet may have a threaded section configured to threadably engage the hose fitting.

In some implementations, the fuel source adapter has a hose fitting attached to the fuel inlet. In those implementations, the hose fitting has a flow regulation insert that is configured to regulate the volume of gas that enters the axial airflow passage from a hose engaged with the hose fitting. The flow regulation insert may have an interior bore with a diameter that is sized to regulate the volume of gas that enters the axial airflow passage through the interior bore.

The details of one or more implementations of the disclosure are set forth in the accompanying drawings and the description below. Other aspects, advantages, purposes, and features will be apparent upon review of the following specification in conjunction with the drawings.

BRIEF DESCRIPTION OF THE DRAWINGS

Like reference symbols in the various drawings indicate like elements.

DETAILED DESCRIPTION

Figure 1:
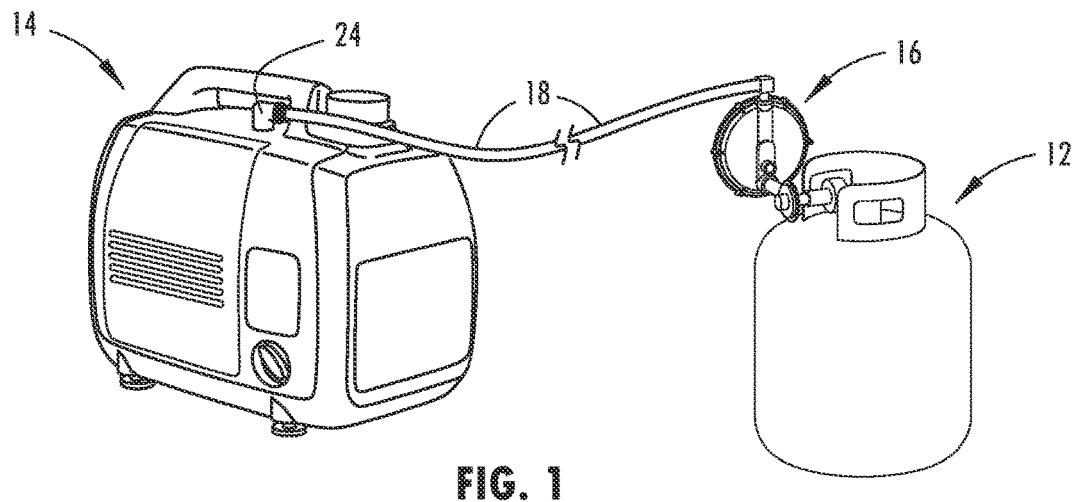
FIG. 1 is a perspective view of a generator having an alternate fuel source.

Referring now to the drawings and illustrative embodiments depicted therein, a system for altering the fuel source of a combustion engine and a fuel source adapter are provided that operate to introduce an alternate fuel source 12 to a machine 14, such as shown in FIG. 1. To introduce the alternative fuel to the engine, the fuel source adapter 100 is located between an air intake manifold 20 and a carburetor 22 having a venturi area that leads to a combustion chamber. The fuel source adapter 100 is compatible with other common modes of air intake and other common alternatives to venturi carburetors, such as a fuel injection throttle body. This disclosure may refer to these devices respectively as an air intake manifold or a venturi carburetor, but it should be known to those skilled in the art that the systems and devices described herein may be compatible with alternatives for these components.

The devices and systems described herein relate to the conversion of a gasoline powered engine to operate using one or more alternate fuel sources. Alternate fuel sources may include propane, natural gas, or methane, but should not be construed to limit application of the present disclosure to usage of only propane, natural gas, or methane. Alternate fuel sources can be desirable for their qualities relating to fuel economy, emissions, and commercial availability.

Traditional gasoline powered engines, such as those used with portable generators, are not readily compatible with alternate fuel sources. Generally, a combustion engine's carburetor is optimized for introducing a gasoline-air mixture to the engine. Similarly, fuel injection systems for some combustion engine use a throttle body for introducing a gasoline-air mixture to the engine However, alternate fuels, such as propane, natural gas, or methane, require different concentrations of air and fuel to optimize engine performance. The proper air to fuel ratio for operating gasoline powered engines with alternate fuel sources can be difficult to achieve precisely and when incorrectly introduced may permanently damage the carburetor, the air intake manifold, and/or other parts within the machine. In some examples, the fuel source adapter introduces a volume of alternative fuel to the engine that is compatible with its original carburetor and air intake manifold.

Figure 2:
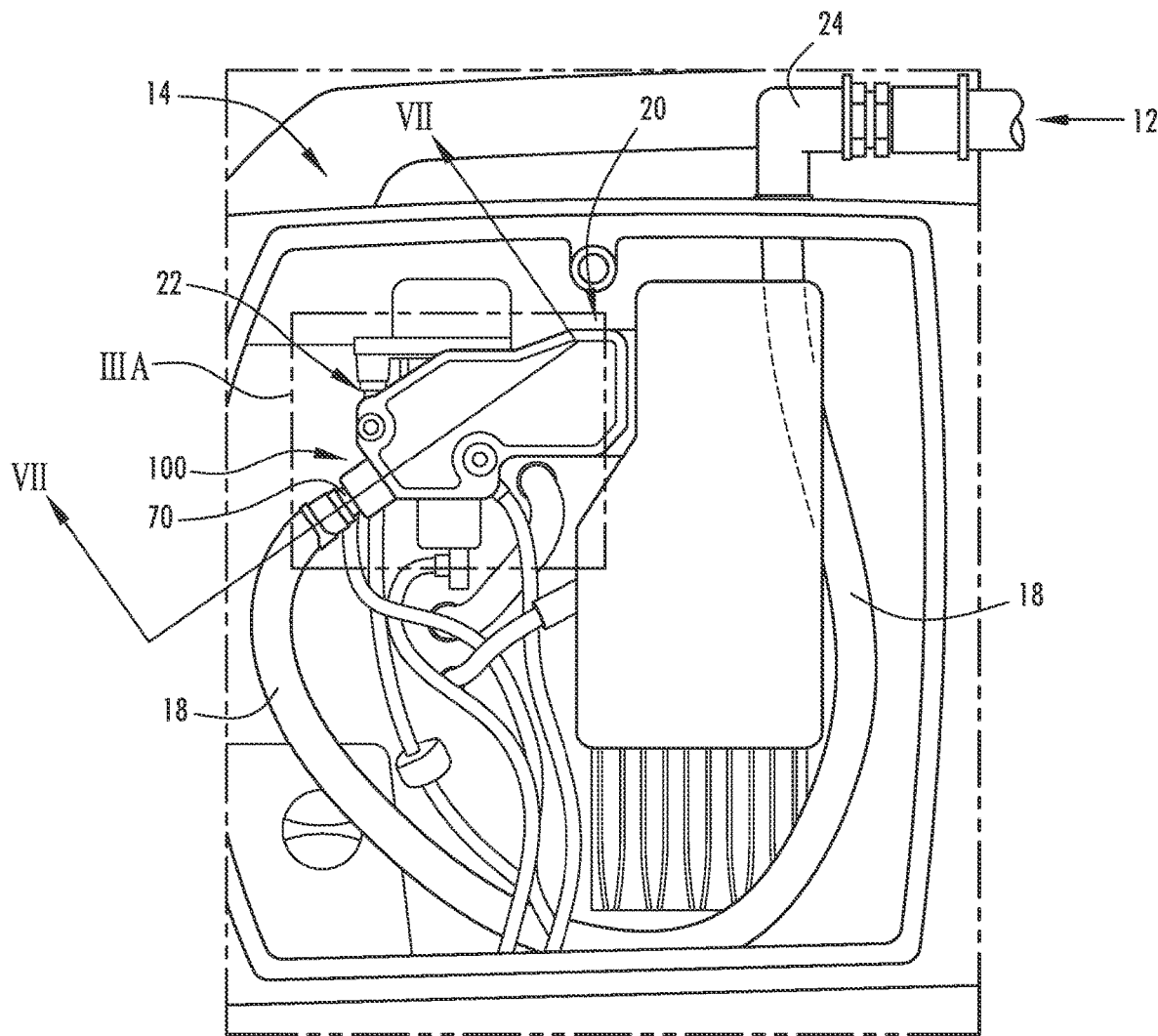
FIG. 2 is a partial elevation view of the generator of FIG. 1 with a cover removed to show a portion of the engine.

As shown in FIGS. 1 and 2, an alternate fuel source 12, such as an exterior propane tank, may be connected to a machine 14 with a combustion engine, such as a portable generator. It should be understood that while the illustrated embodiments primarily show the system and fuel source adapter 100 in use with a propane tank 12 and generator 14, the system and fuel source adapter 100 may be compatible with other similar combustion engine systems.

As shown in FIG. 1, a propane tank 12 is connected to a pressure regulator 16. The pressure regulator 16 operates to provide a consistent flow of fuel from the propane tank 12. Connected to the pressure regulator 16 is a length of hose 18, carrying fuel from the pressure regulator 16 towards and to the generator 14. At a distal end of the hose 18 from the pressure regulator 16 is a quick release connection valve 24. A second section of hose 18 connects the connection valve 24 to the fuel source adapter 100, such as shown in FIG. 2 the hose 18 is disposed inside the generator housing. This configuration of connecting an alternate fuel source 12 to a generator 14 allows for quick disconnect between the fuel source 12 and generator 14. However, other implementations may otherwise directly or indirectly connect an alternate fuel source 12 to the fuel source adapter 100.

As shown in FIG. 2, a fuel source adapter 100 is installed in a generator's combustion engine at a location between an air intake manifold 20 and a carburetor 22. In other example that have a throttle body in place of the carburetor, the fuel source adapter is installed at the location between the air intake manifold and the throttle body. This installation location is accessed by removing the cover from the generator's housing and the fuel source adaptor 100 is configured to allow the cover to be reattached and secured to the housing to conceal the engine and the internal section of hose. The fuel source adapter 100 has a hose fitting 70. The hose fitting 70 receives an end of the length of hose 18 that is in fluid connection with the fuel source 12. The hose fitting 70 may be threadably connected to the fuel source adapter 100.

Figure 3A:
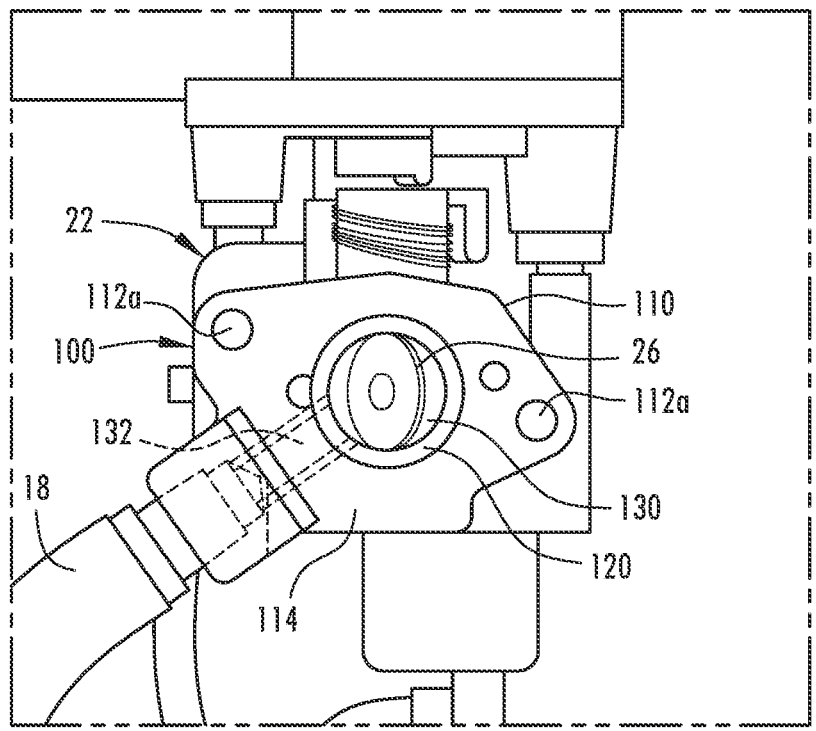
FIG. 3A is an enlarged elevation view of the engine compartment taken at section IIIA of FIG. 2, showing the fuel source adapter with the air intake manifold removed.

Turning now to FIG. 3A, a cross-sectional view of section IIIA shown in FIG. 2 that depicts the fuel source adapter 100 as it would be installed and connected to the carburetor 22 of the generator 14. The fuel source adapter 100 mounts between the air inlet side of the carburetor 22 and the outlet side of the air intake manifold 20 within the engine. The fuel source adapter 100 has a spacer plate 110 and a velocity stack 120. The fuel source adapter 100 may be made from machined aluminum, steel, or any other suitable material capable of withstanding the engine's heat fluctuations.

The fuel source adapter 100 as shown couples to the engine's air intake manifold 20 via bolt holes 112*a* in the spacer plate 110. The bolt holes 112*a* are configured to match to corresponding connection points between the air intake manifold 20 and carburetor 22. The bolt holes 112*a* receive the mounting bolts intended to connect the air intake manifold 20 to the carburetor 22. In the illustrated example, bolts pass from the carburetor 22, through the bolt holes 112*a* of the fuel source adapter 100, and to corresponding connection points at the air intake manifold 20. Conversely, the bolts may pass from the air intake manifold 20, through the bolt holes 112*a* of the fuel source adapter 100, and to corresponding connection points at the carburetor 22. Location of the bolt holes 112*a* may vary depending upon the locations of the corresponding connection points within the receiving engine.

The spacer plate 110 of the fuel source adapter 100 has an air intake-facing surface 114 (FIG. 4A) and a carburetor-facing surface 116 (FIG. 5A) opposite the air intake-facing surface 114. Since the fuel source adapter can also be mounted between an air intake manifold and a throttle body, the carburetor-facing surface may also be generally referred to as a combustion-facing surface. The spacer plate 110 is defined by a thickness of material between the air intake-facing surface 114 and the carburetor-facing surface 116. When installed, the thickness of material provided by the spacer plate 110 causes the intake manifold to be moved outward toward the cover the of the generator housing, such that the clearance provided inside the generator housing limits the thickness of the spacer plate to still allow the cover to be reattached after installation of the fuel source adapter.

Figure 4A:
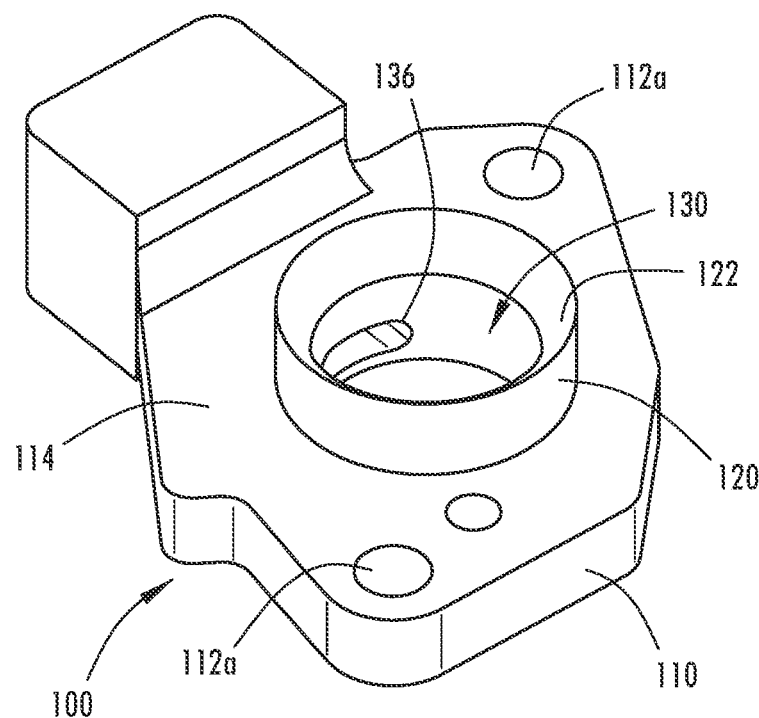
FIG. 4A and FIG. 4B are perspective views of the fuel source adapter.
Figure 4B:
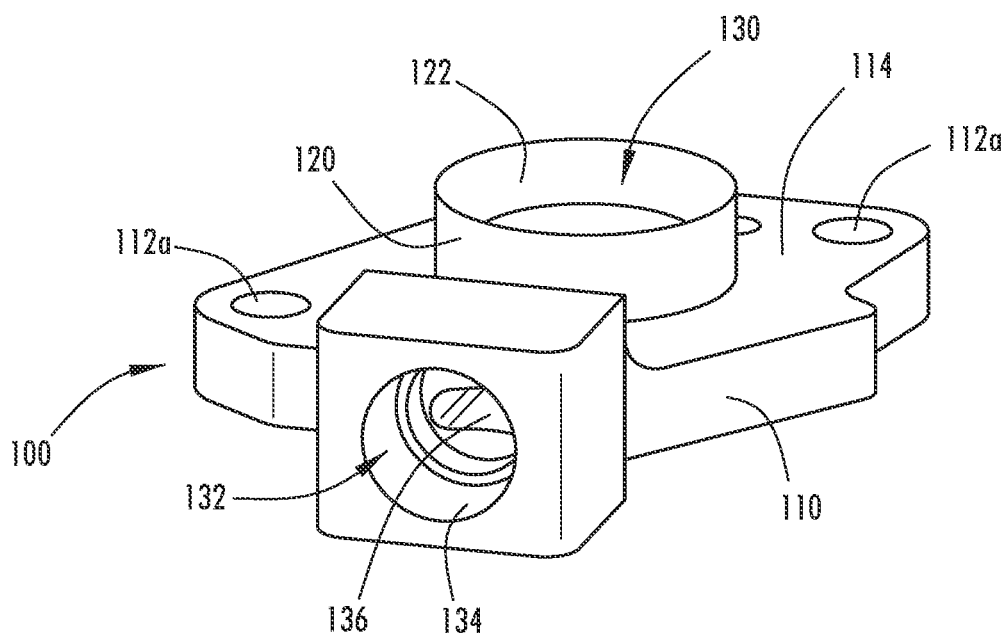

Further depicted in FIGS. 4A and 4B, the spacer plate 110 has an axial airflow passage 130 and a transverse fuel inlet 132. The axial airflow passage 130 extends through the spacer plate 110 and both the air intake-facing surface 114 and the carburetor-facing surface 116. The axial airflow passage 130 is defined by an interior surface of the spacer plate 110. The axial airflow passage 130 corresponds to an intake opening in the carburetor 22. Although the axial airflow passage 130 is depicted as a cylindrical throughway with a substantially round opening, it should be understood that other configurations are possible that would allow for compatibility with various carburetor and air intake applications.

Figure 5:
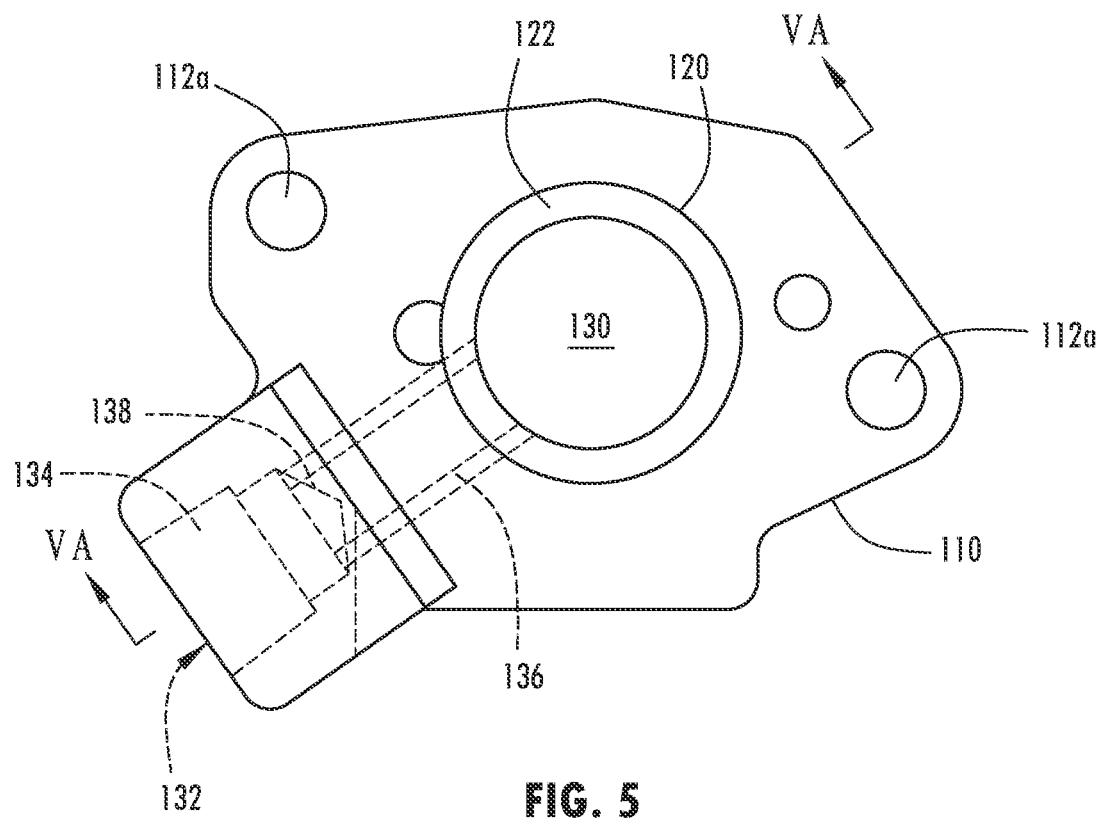
FIG. 5 is an elevation view of the fuel source adapter.
Figure 5A:
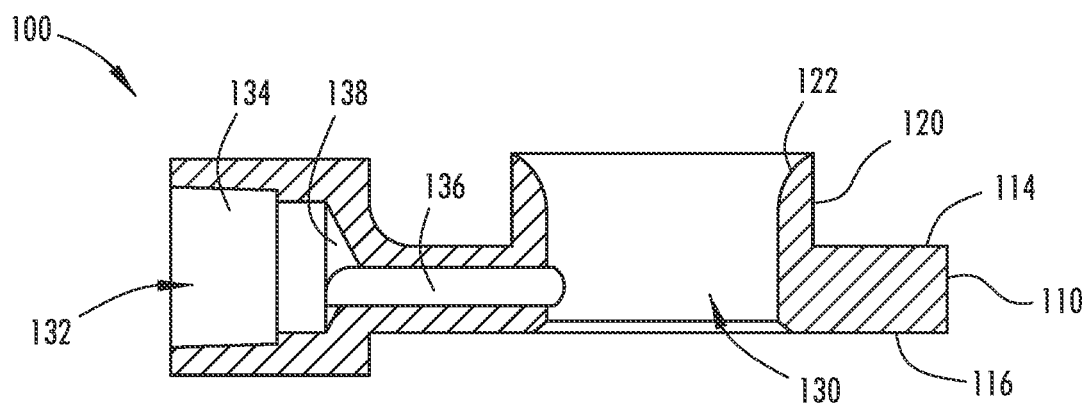
FIG. 5A is a cross-sectional view of the fuel source adapter taken at line VA-VA shown in FIG. 5.
Figure 6:
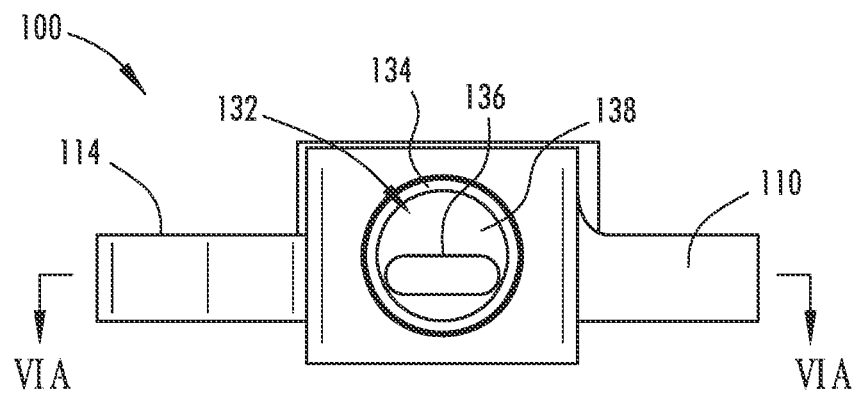
FIG. 6 is a side elevation view of the fuel source adapter.
Figure 7:
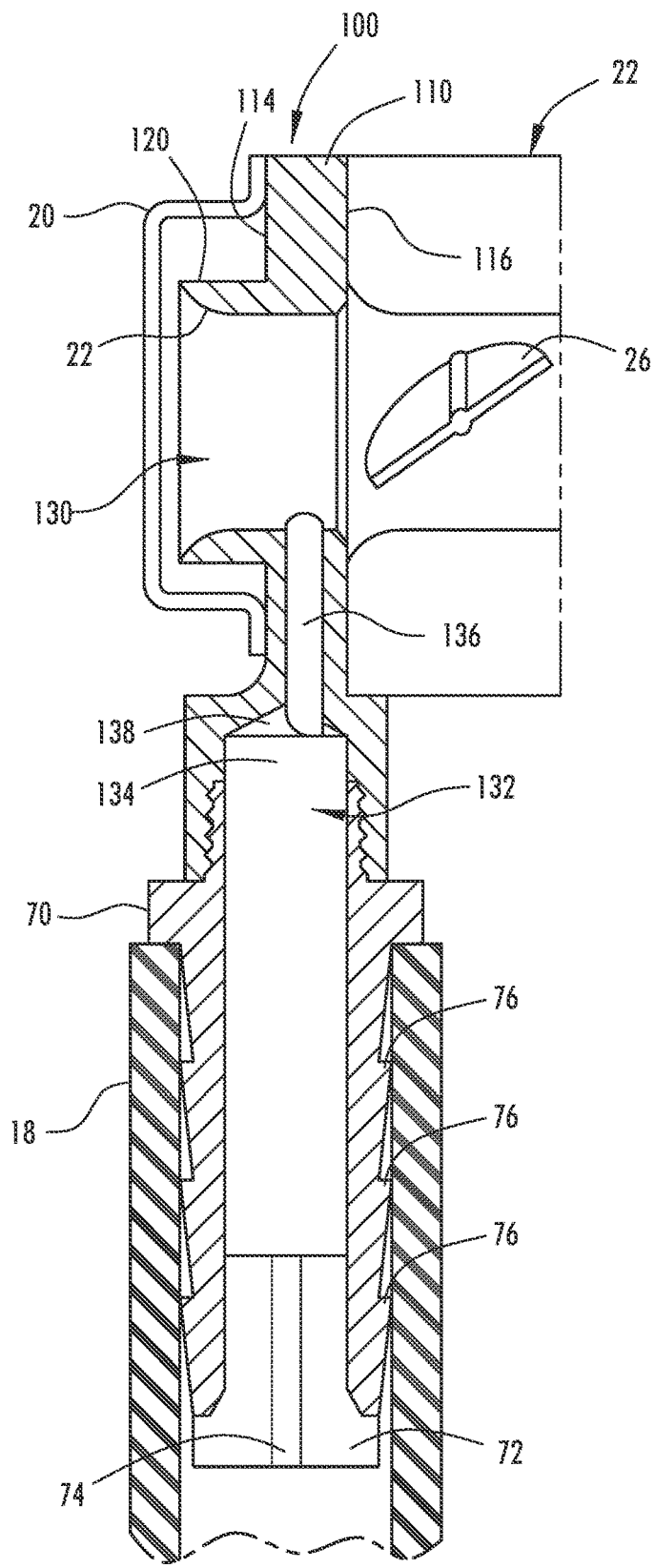
FIG. 7 is a cross-sectional view of the fuel source adapter installed in a generator taken at line VII-VII shown in FIG. 2.

As shown for example in FIGS. 5-7, the spacer plate 110 also has a transverse fuel inlet 132 extending through the thickness of the spacer plate 110 to the interior surface of the spacer plate 110 defining the axial airflow passage 130. In the illustrated example, the transverse fuel inlet 132 is shown as having a circular cross-sectional area at the end proximal to the hose 18 tapering to an oval-like cross-sectional area at the point where the transverse fuel inlet 132 intersects the axial airflow passage 130, but it should be understood that the transverse fuel inlet 132 could be functional having a non-circular or irregular cross-sectional area. The transverse fuel inlet 132 allows for fluid connection between the hose 18 connected to the alternate fuel source 12 and the fuel source adapter 100.

The fuel source adapter 100 also has a velocity stack 120. The velocity stack 120 extends from the air intake-facing surface 114 of the spacer plate 110 about the perimeter of the axial airflow passage 130. The velocity stack 120 extends to the air intake manifold 20 and, in some examples, may be placed inside the air intake manifold 20 to reduce the spatial footprint of the fuel source adapter 100.

Figure 11:
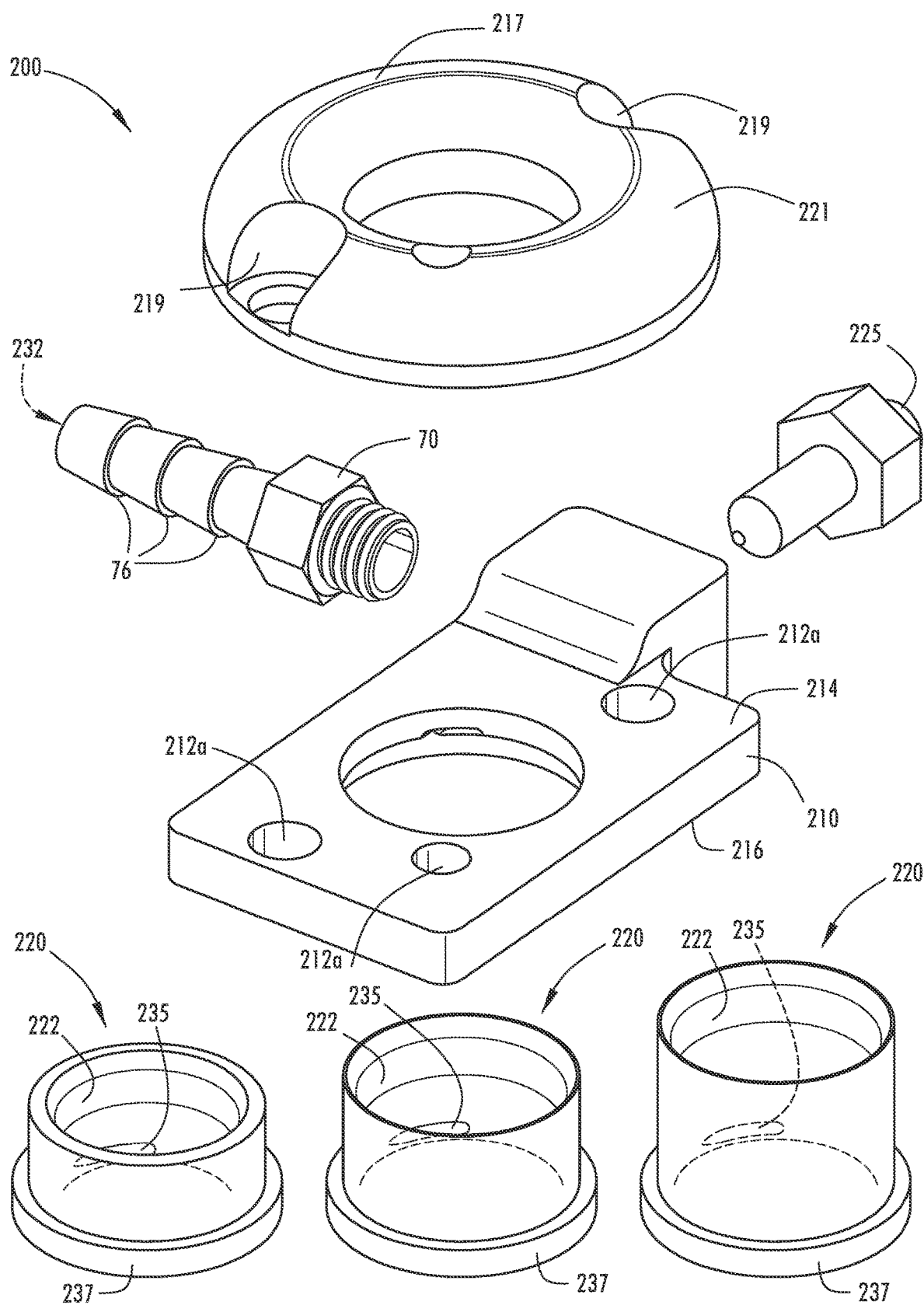
FIG. 11 is an exploded view of the fuel source adapter, showing three interchangeable additional velocity stacks.
Figure 12A:
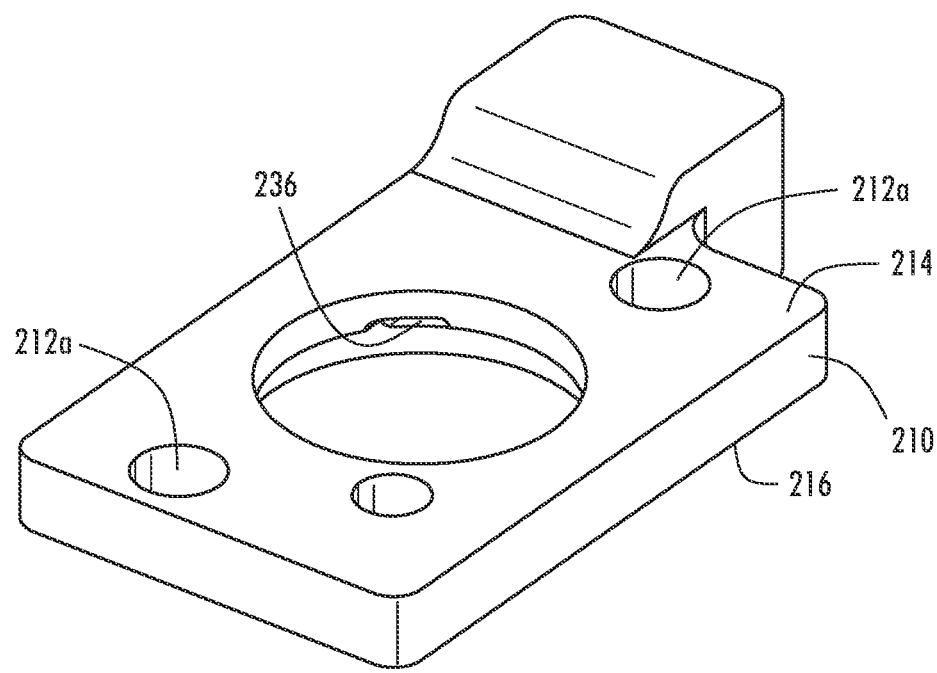
FIGS. 12A and 12B are perspective views of a portion of the fuel source adapter.
Figure 12B:
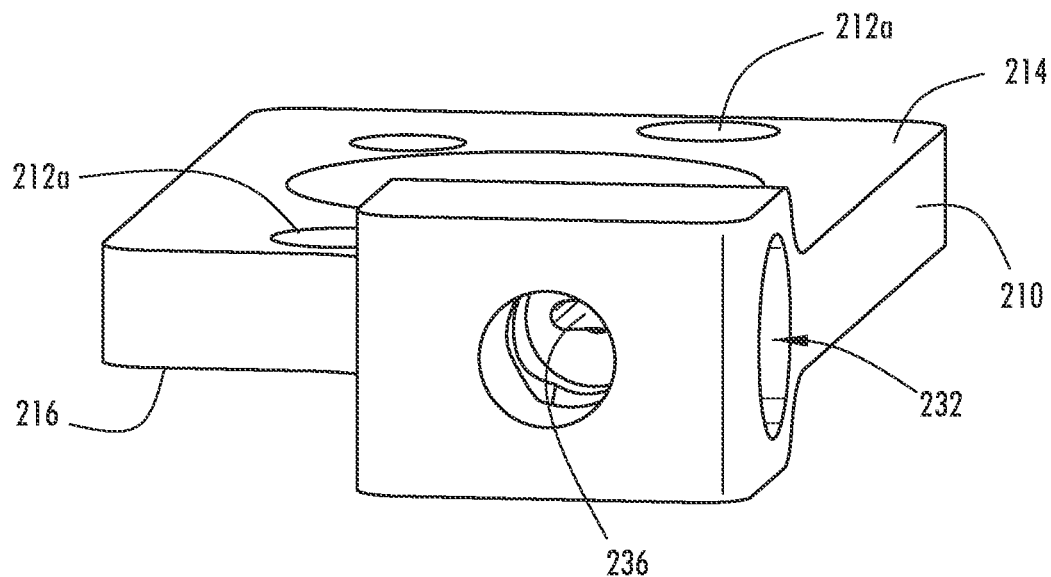

The fuel source adapter 100, which includes a velocity stack 120 and the spacer plate 110, may be a single, integral piece. As shown in the example in FIGS. 4A-6A, the single integral piece of the fuel source adapter 100 has the velocity stack 120 integrally formed with the spacer plate 110, such as being machined from a single material. Conversely, the fuel source adapter may be assembled from two or more separate pieces coupled together, such as a velocity stack being attached to a spacer plate portion (e.g., via a threaded or other type of releasable connection), such as where a different or desired sized velocity stack may be used for a specific engine or desired performance, such as shown in FIG. 11.

Figure 3B:
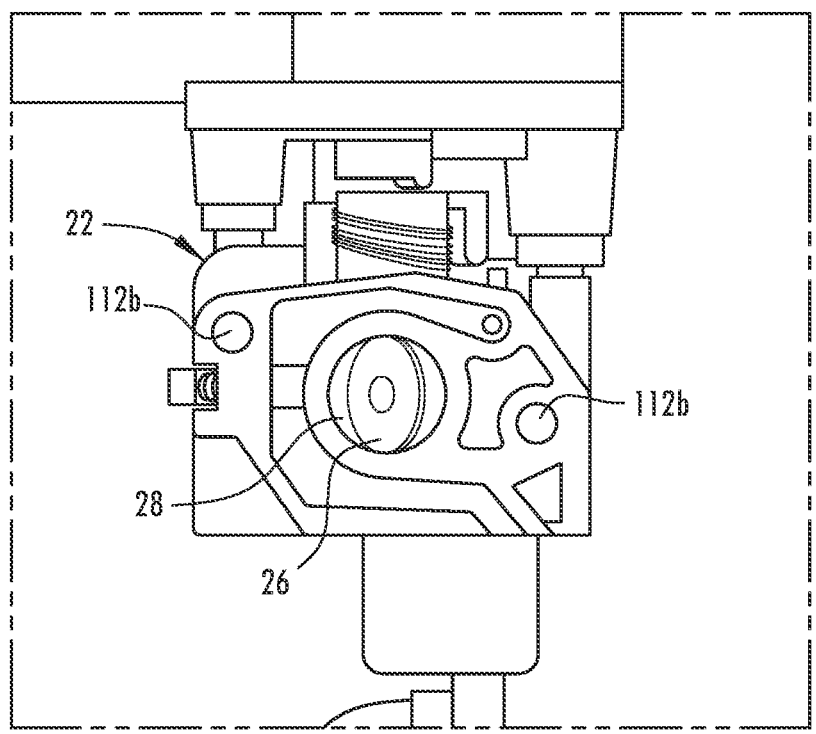
FIG. 3B is another elevation view of the engine compartment taken at section IIIA of FIG. 2, showing the carburetor with the fuel source adapter also removed.

Referring now to FIG. 3B, section IIIA shown in FIG. 2 is presented with the fuel source adapter 100 removed from the carburetor 22. The carburetor 22 in this illustrative example has a round intake opening 28 corresponding with the cross-sectional area of the axial airflow passage 130 of the fuel source adapter 100. The carburetor 22 is also shown having bolt holes 112b corresponding to bolt holes 112a in the fuel source adapter for proper coupling of the two devices. The carburetor also has a choke 26, depicted as a butterfly valve, which opens and closes by rotating about its vertical axis to alter the vacuum pressure caused by the engine's fuel draw.

Referring now to FIGS. 4A and 4B, a fuel source adapter 100 is shown having a velocity stack 120 extending from the air intake-facing surface 114 of the fuel source adapter 100. The velocity stack 120 extends about the perimeter of the axial airflow passage 130 and is configured to receive airflow from the air intake manifold 20. The velocity stack 120 has an interior surface which defines a horn shaped opening, constituting a tapered-expanding mouth 122, to the axial airflow passage 130. The tapered-expanding mouth 122 receives air from the air intake manifold 20 in such a way as to compress the inflow of air. A tapered-expanding mouth 122 also functions to smooth the inflow of air from the air intake manifold 20, reducing the chance of inconsistent air supply to the engine. Inconsistent air supply can result in an inconsistent fuel to air mixture entering the combustion area of the engine, leading to inconsistent and undesirable performance.

Alternate fuel enters the fuel source adapter 100 through the transverse fuel inlet 132 disposed within the thickness of the spacer plate 110. As depicted, the transverse fuel inlet 132 is defined by a circular opening 134 in and extending through the spacer plate body 110. The transverse fuel inlet 132 may taper to an oval, non-circular, or irregular-shaped opening 136 at the axial airflow passage 130. The channel formed by the transverse fuel inlet 132 and the opening 136 into the axial airflow passage 130 may correspond to a particular alternate fuel source so as to provide a determined fuel to air ratio to the engine. A transverse fuel inlet 132 with a circular opening 134 can be threaded to allow for connection to a hose fitting 70.

Figure 6A:
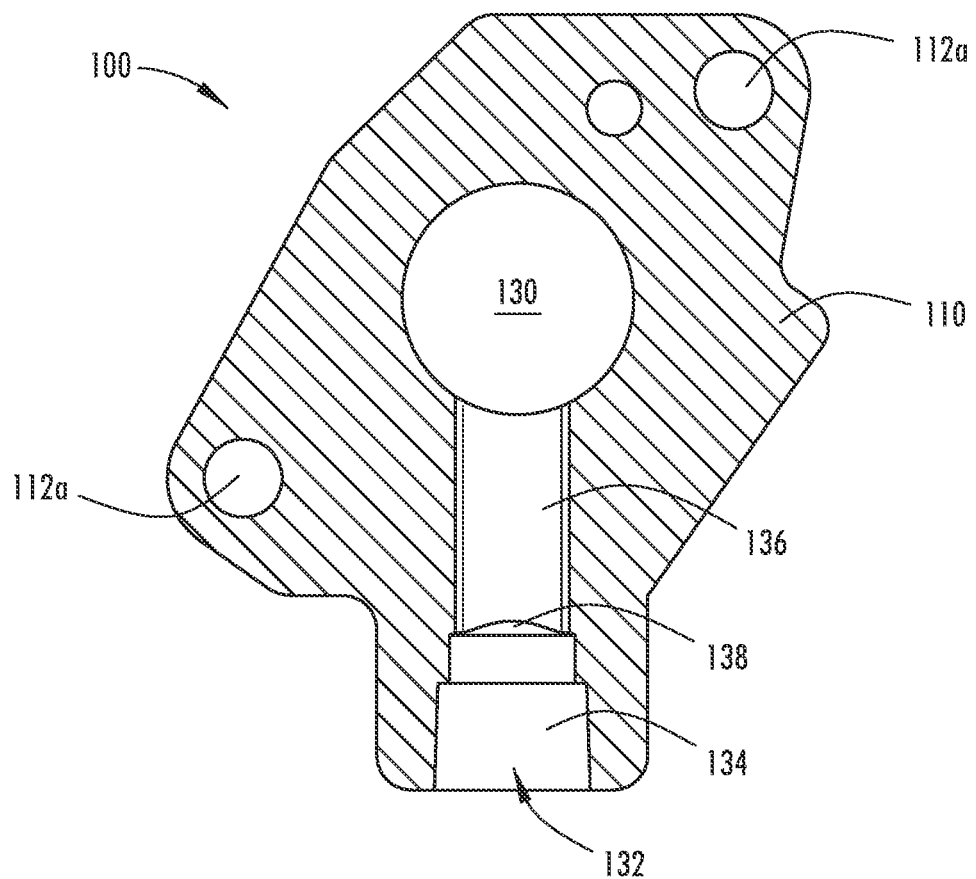
FIG. 6A is a cross-sectional view of the fuel source adapter taken at line VIA-VIA shown in FIG. 6.

Referring now to FIGS. 5-6A, a transverse fuel inlet 132 is shown having a circular opening 134 disposed in and extending into the spacer plate 110. This circular portion 134 may be threaded to facilitate connection to a hose fitting 70. A tapered chamber portion 138 is shown extending into the spacer plate 110 from the circular portion 132 of the transverse fuel inlet 130. Extending further into the spacer plate 110 from the tapered chamber portion 138 is an oval channel portion 136 of the transverse fuel inlet 132. The oval channel 136 intersects the axial airflow passage 130, placing the transverse fuel inlet 132 in fluid connection with the axial airflow passage 130. The oval shape of the oval channel 136 is formed to position the smaller width in the thickness of the spacer plate 110 and the greater width of the oval shape perpendicular to the thickness of the spacer plate 110. The oval channel 136 is substantially perpendicular to the axial airway passage 130 of the spacer plate 110 of the fuel source adapter 100 that axially aligned with and extends through the velocity stack 120.

Turning now to FIG. 7, section VII shown in FIG. 2 is presented to depict a cross-sectional area of a commercial embodiment of the fuel source adapter 100 in use on a conventional combustion engine system. The fuel source adapter 100 is positioned between the air intake manifold 20 and the carburetor 22. The carburetor-facing surface 116 of the spacer plate 110 is in direct contact with an outer surface of the carburetor 22 so as to create an airtight seal. The air intake-facing surface 114 of the spacer plate 110 is in direct contact with an outer surface of the air intake manifold 20 so as to create an airtight seal. The axial airflow passage 130 of the fuel source adapter 100 is aligned with an intake opening in the carburetor 22 to allow for airflow between the fuel source adapter 100 and the carburetor 22.

The velocity stack 120 of the fuel source adapter 100 extends from the air intake-facing surface 114 of the spacer plate 110 into the air intake manifold 20. This reduces the spatial footprint of the fuel source adapter 100 within the engine compartment. Although the velocity stack 120 is depicted as extending at least partially into the air intake manifold 20, it should be understood that functionality may be achieved with the velocity stack 120 fully extended into the air intake manifold 20 or with the velocity stack 120 extended only up to the air intake manifold 20.

In this illustrative example, the fuel source adapter 100 is shown with a hose fitting 70. The hose fitting 70 is threadably connected to the fuel source adapter 100 at the transverse fuel inlet 132 and is configured to engage a fuel hose 18. The hose fitting 70 is further shown with a flow regulation insert 72 configured to regulate the volume of gas that enters the transverse fuel 132 inlet from the alternate fuel source 12. The flow regulation insert 72 has an interior bore 74 with a diameter that is sized to regulate the volume of gas that may pass through. The flow regulation insert 72 may be removable from the hose fitting 70 and replaced with a different flow regulation insert 72 with a bore diameter 74 corresponding to a desired alternate fuel source 12. Alternatively, the flow regulation insert 72 may be irremovably coupled to the hose fitting 70 such that removing the hose fitting 70 and replacing with a second hose fitting 70 may be necessary to achieve a desired flow rate for a specific alternate fuel source 12. Here, the hose fitting 70 is shown as having traditional barbed hose connector points 76. However, it should be understood that other coupling means may be utilized, such as threading, that would provide a sealed and fluid connection between a fuel source 12 and the fuel source adapter 100.

When operational, alternate fuel travels from an alternate fuel source 12 to the axial airflow passage 130 that leads into the carburetor 22 through the fuel hose 18 and the transverse fuel inlet 132 provided by the spacer plate 110. The fuel hose 18 may connect to a hose fitting 70 threadably coupled to the fuel source adapter 100 at the transverse fuel inlet 132. A hose fitting 70 may have a flow regulation insert 72 and the volume of alternate fuel entering the transverse fuel inlet 132 may be controlled by the diameter of the bore 74 of the flow regulation insert 72. To operate as a fuel flow regulator, the diameter of the flow regulation insert 72 is generally the smallest diameter between the fuel source 12 and the axial airflow passage 130.

As vacuum pressure increases from the carburetor 22, airflow is pulled from the air intake manifold 20. Vacuum pressure may be increased or decreased by opening or closing the carburetor choke 26 while the engine is running. Opening the choke 26 so that it is more parallel with respect to the axial airflow passage 130 increases the engine's demand for airflow. Closing the choke 26 so that is more perpendicular with respect to the axial airflow passage 130 reduces the engine's demand for airflow. As air is pulled from the air intake manifold 20, the airflow is compressed and smoothed by the velocity stack 120 of the fuel source adapter 100. The vacuum pressure also pulls alternate fuel from the transverse fuel inlet 132 into the axial airflow passage 130. In the axial airflow passage 130, the alternate fuel mixes with the air from the air intake manifold 20 and is pulled into the carburetor 22 by the engine's vacuum pressure.

Figure 8:
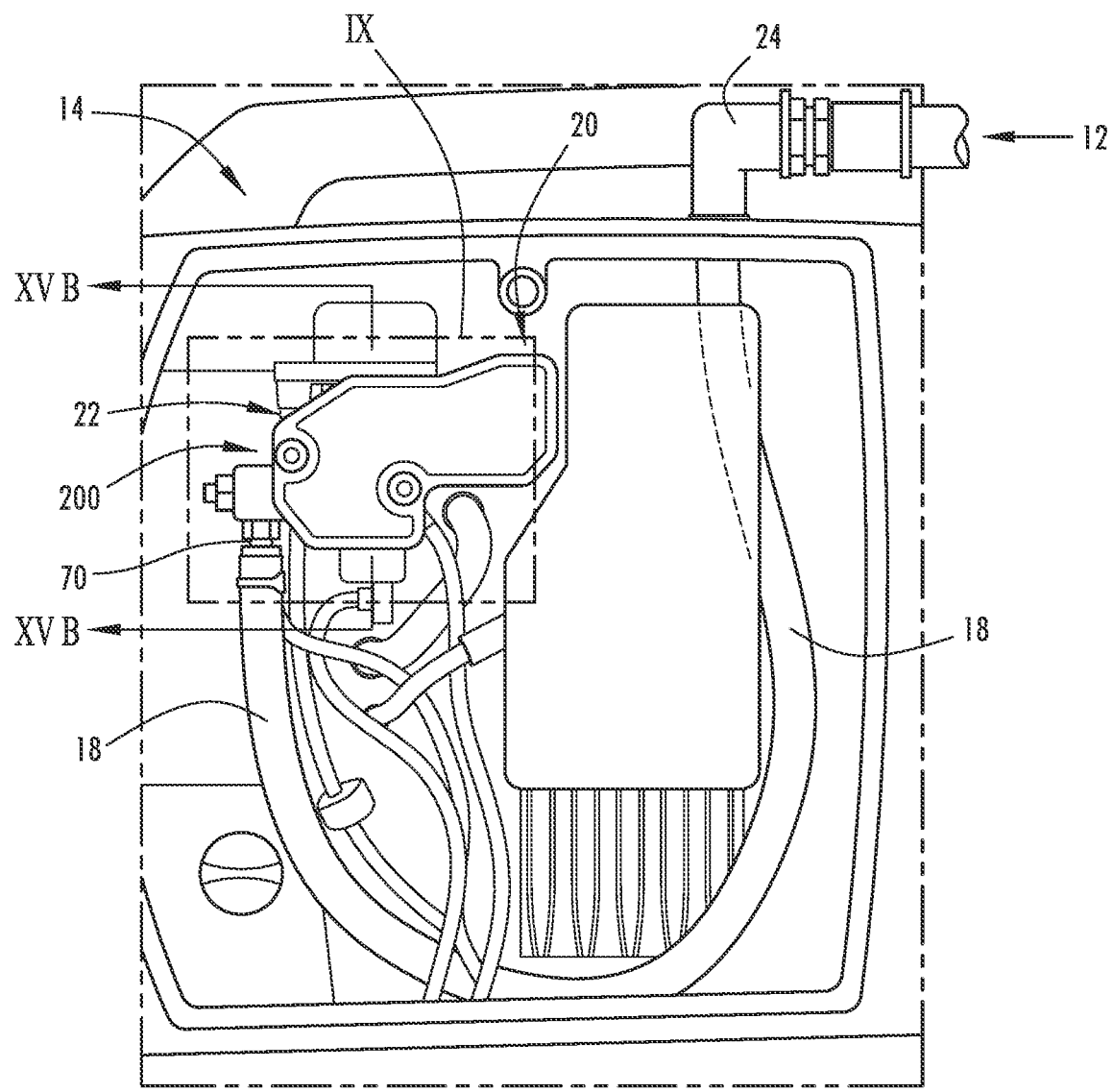
FIG. 8 is a partial elevation view of a generator's engine according to another example.

Referring now to the examples shown in FIGS. 8-15B, a system for altering the fuel source of a combustion engine and a fuel source adapter 200 are provided that operate to introduce an alternate fuel source 12 to a machine 14, such as the generator shown in FIG. 8. To introduce the alternative fuel to the engine, the fuel source adapter 200 is located between an air intake manifold 20 and a carburetor 22 having a venturi area. The fuel source adapter 200 is compatible with other common modes of air intake and other common alternatives to venturi carburetors. The fuel source adapter 200 may include many similar features as described above with respect to the fuel source adapter 100. These features may be described below and like features include like reference numbers increased by a factor of 100.

Figure 9:
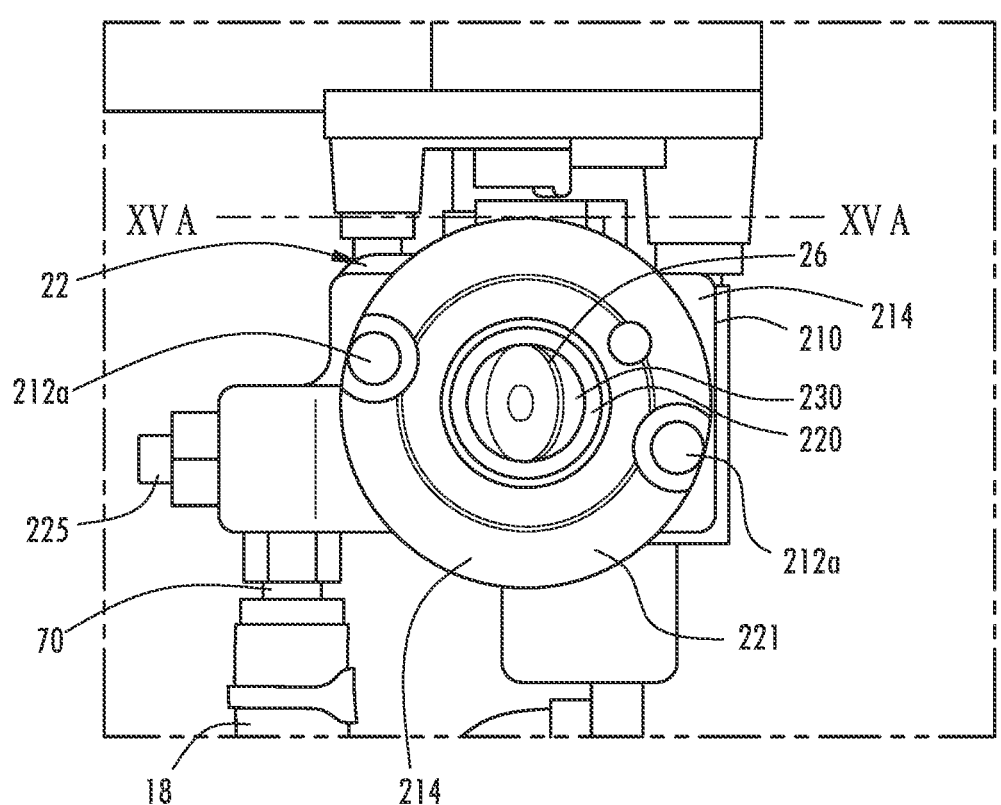
FIG. 9 is an enlarged elevation view of the engine compartment taken at section IX of FIG. 8, showing the fuel source adapter with the air intake manifold removed.

Turning now to FIG. 9, similar to the fuel source adapter 100 as described above, the fuel source adapter 200 may be connected to the carburetor 22 of the generator 14. The fuel source adapter 200 mounts between the air inlet side of the carburetor 22 and the outlet side of the air intake manifold 20 within the engine. The fuel source adapter 200 has a spacer plate 210 and a velocity stack 220. The fuel source adapter 200 may be made from machined aluminum, steel, or any other suitable material or combinations thereof.

The fuel source adapter 200 as shown couples to the engine's air intake manifold 20 via bolt holes 212a in the spacer plate 210. The bolt holes 212a are configured to match to corresponding connection points between the air intake manifold 20 and carburetor 22. The bolt holes 212a receive the mounting bolts intended to connect the air intake manifold 20 to the carburetor 22. In the illustrated example, bolts would pass from the carburetor 22, through the bolt holes 212a of the fuel source adapter 200, and to corresponding connection points at the air intake manifold 20. Conversely, the bolts may pass from the air intake manifold 20, through the bolt holes 212a of the fuel source adapter 200, and to corresponding connection points at the carburetor 22. Location of the bolt holes 212a may vary depending upon the locations of the corresponding connection points within the receiving engine.

Figure 13:
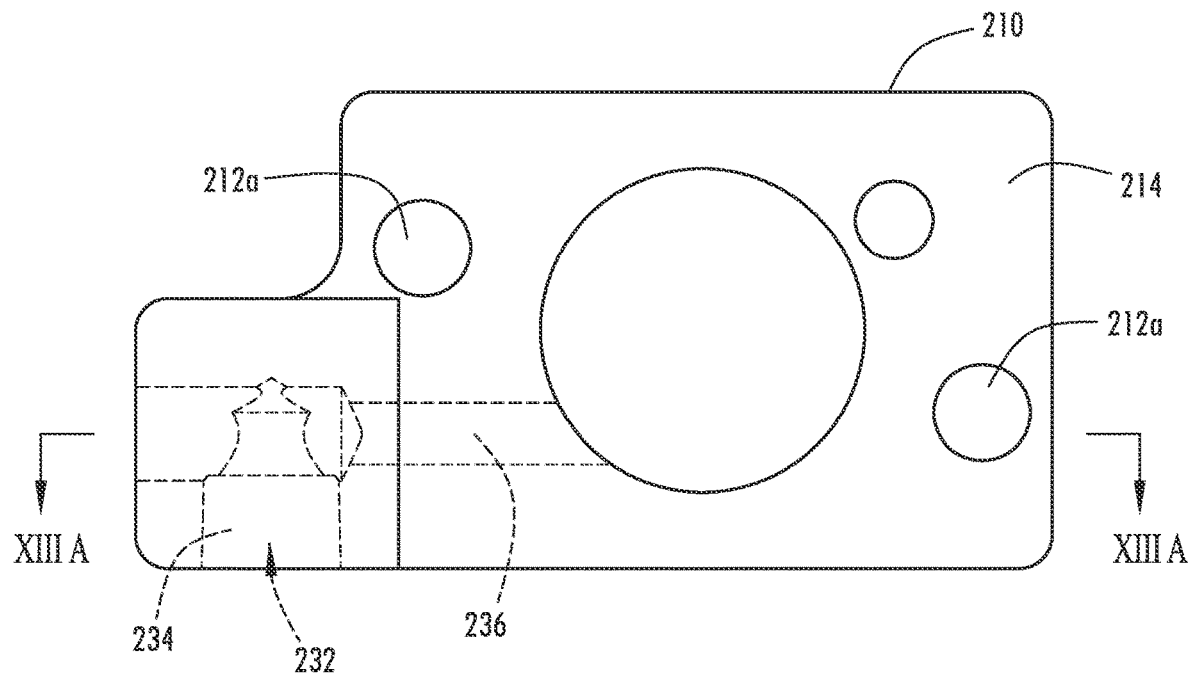
FIG. 13 is a top plan view of the portion of the fuel source adapter shown in FIGS. 12A and 12B.
Figure 13A:
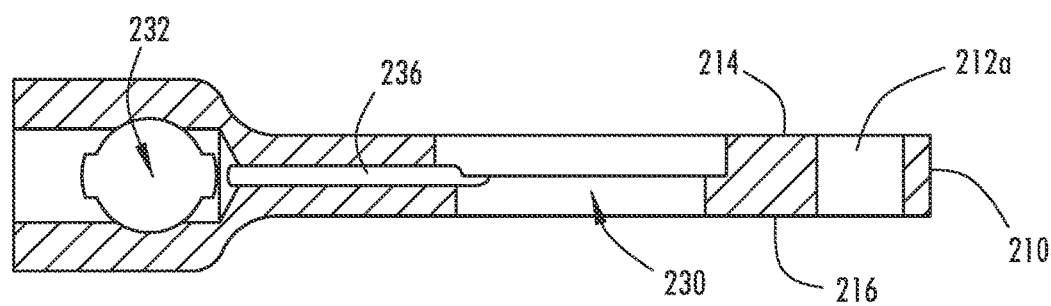
FIG. 13A is a cross sectional view of the fuel source adapter taken at line XIIIA-XIIIA shown in of FIG. 13.
Figure 14:
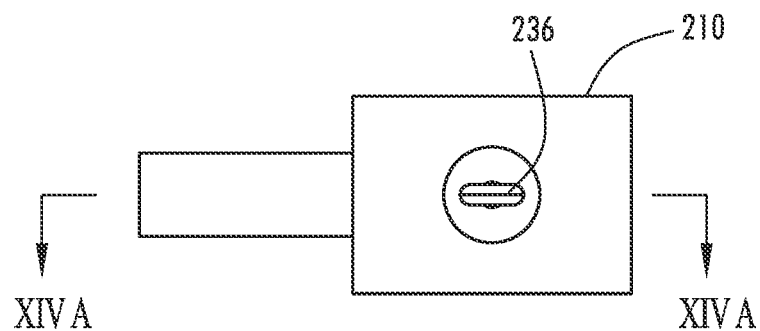
FIG. 14 is a side elevation view of the portion of the fuel source adapter shown in FIGS. 12A and 12B.
Figure 14A:
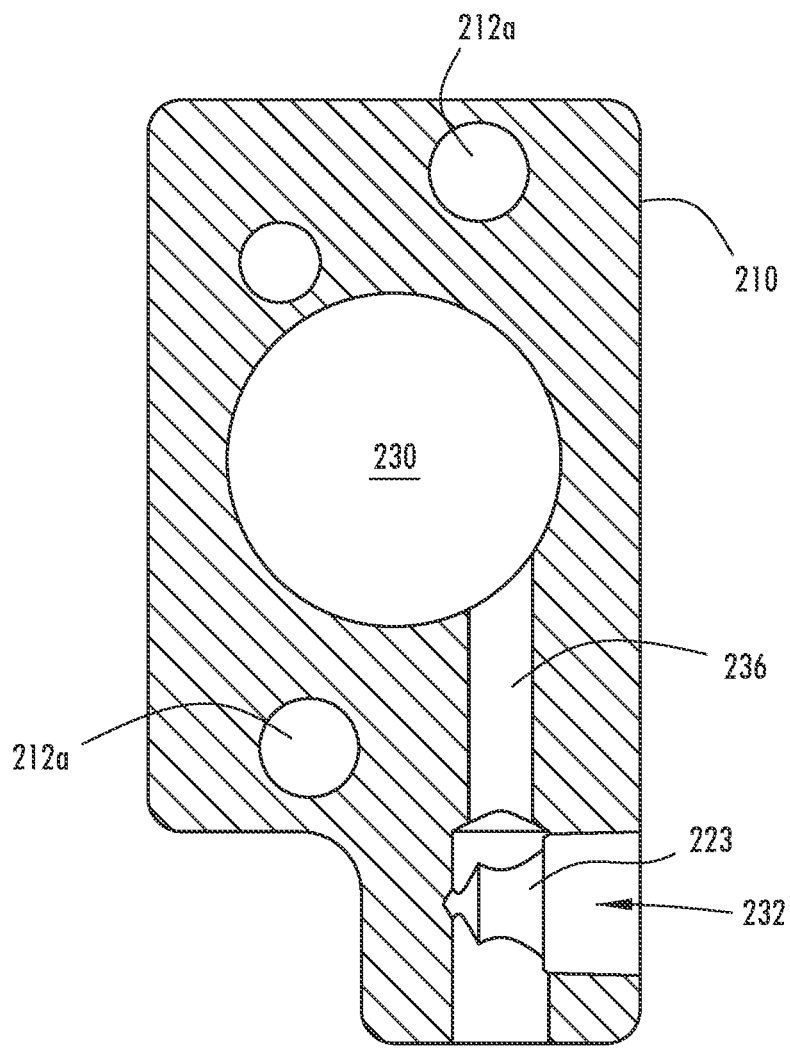
FIG. 14A is a cross-sectional view of the fuel source adapter taken at line XIVA-XIVA shown in of FIG. 14.

The spacer plate 210 of the fuel source adapter 200 has an air intake-facing surface 214 and a carburetor-facing surface 216 opposite the air intake-facing surface 214. The spacer plate 210 is defined by a thickness of material between the air intake-facing surface 214 and the carburetor-facing surface 216, such as shown in FIG. 13A.

Figure 15A:
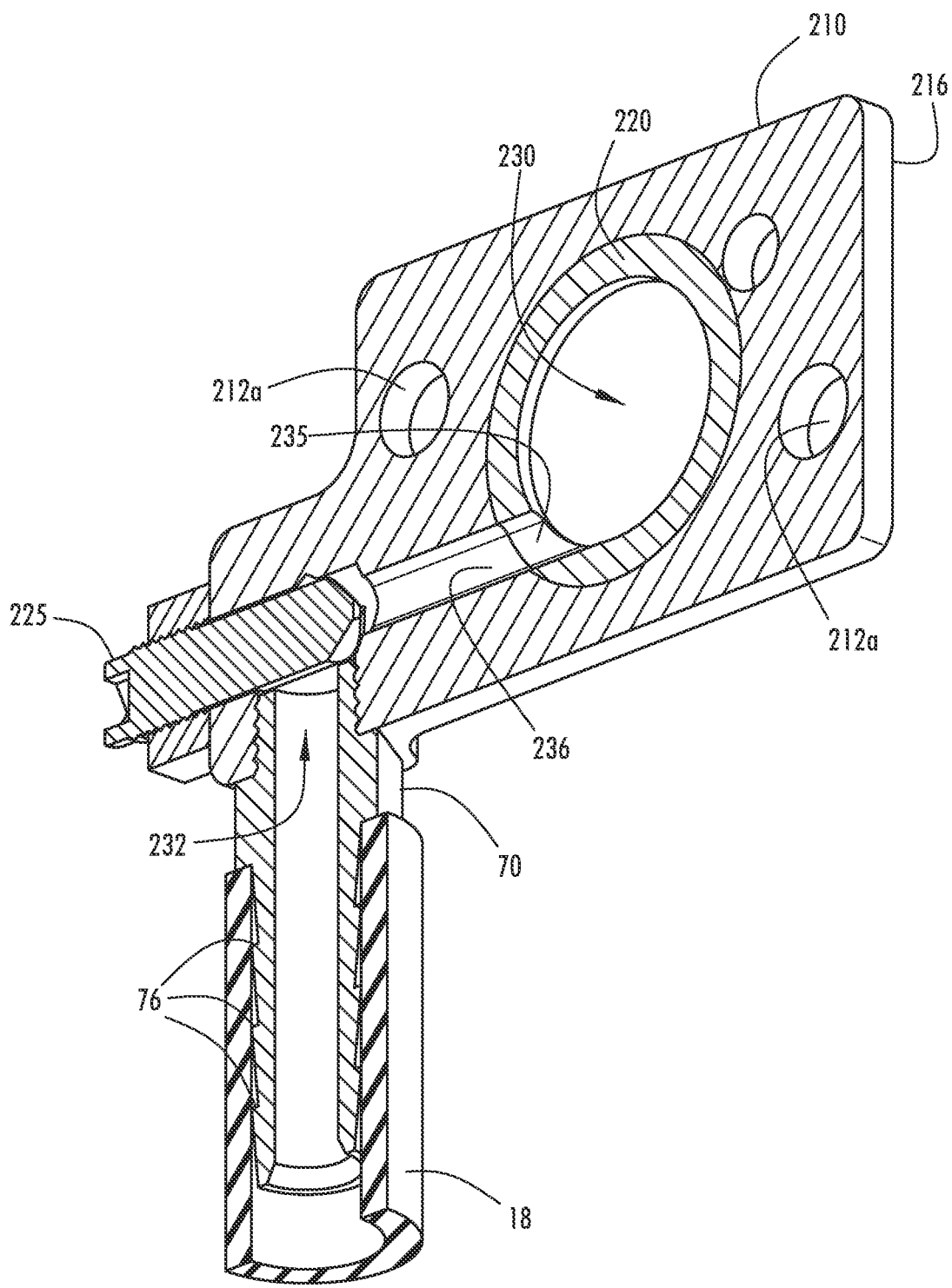
FIG. 15A is a cross-sectional view of the fuel source adapter taken at line XVA-XVA shown in FIG. 9.
Figure 15B:
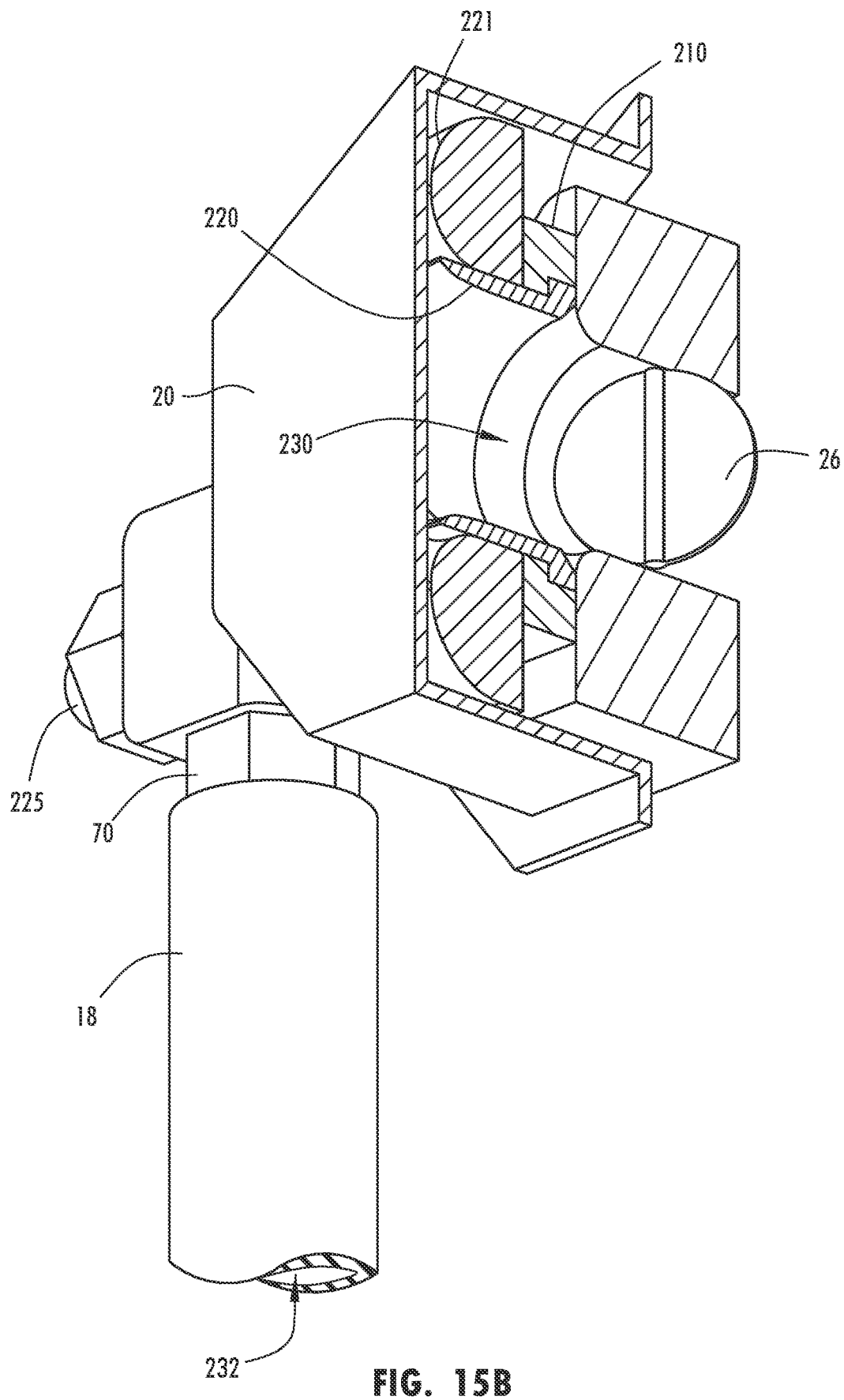
FIG. 15B is a cross-sectional view of the fuel source adapter installed at the engine and taken at line XVB-XVB shown in FIG. 8.

Further depicted in FIGS. 12A-14A, the spacer plate has an axial airflow passage 230 and a transverse fuel inlet 232. The axial airflow passage 230 extends through the spacer plate 210 and both the air intake-facing surface 214 and the carburetor-facing surface 216. The axial airflow passage 230 is defined by an interior surface of the spacer plate 210. The axial airflow passage 230 corresponds to an intake opening in the carburetor 22 (FIG. 15B). Although the axial airflow passage 230 is depicted as a cylindrical throughway with a substantially round intake opening, it should be understood that other configurations are possible that would allow for compatibility with various carburetor and air intake applications.

As shown for example in FIGS. 10A-15A, the spacer plate 210 also has a transverse fuel inlet 232 extending through the thickness of the spacer plate 210 to the interior surface of the spacer plate 210 defining the axial airflow passage 230. In the illustrated example, the transverse fuel inlet 232 is shown as having a circular cross-sectional area at the end proximal to the hose 18 tapering to an oval-like cross-sectional area at the point where the transverse fuel inlet 232 intersects the axial airflow passage 230. It should also be understood that the transverse fuel inlet in additional examples may have a non-circular or irregular cross-sectional area. The transverse fuel inlet 232 allows for fluid connection between the hose 18 connected to the alternate fuel source 12 and the fuel source adapter 200.

The fuel source adapter 200 also has a velocity stack 220. The velocity stack 220 extends from the air intake-facing surface 214 of the spacer plate 210 about the perimeter of the axial airflow passage 230. The velocity stack 220 extends to the air intake manifold 20 and, in some examples, may be placed inside the air intake manifold 20 to reduce the spatial footprint of the fuel source adapter 200.

As shown in FIGS. 8-15B, the fuel source adapter 200 is assembled from two or more separate pieces coupled together, such as a velocity stack 220 being attached to the spacer plate 210, such as where a different or desired sized velocity stack may be used for a specific engine or desired performance. As shown in FIG. 11, the velocity stack 220 includes cylindrical wall portion that surrounds and generally defines the axial airflow passage 230 (FIG. 15B) and a base portion with a collar 237 that extends radially outward from the diameter of the cylindrical wall portion. The collar 237 at the base portion is sized to engage in a recessed area at the interior surface of the spacer plate 214 (FIG. 15B). Additionally, the collar 237 may include one or more notched portions configured to secure the velocity stack 220 to the spacer plate.

As further shown in FIG. 11, the velocity stack 220 may have various thicknesses corresponding with various interior diameter sizes of the velocity stack. Moreover, it is contemplated that the velocity stack 220 may have various lengths designed to couple to the air intake manifold depending on the desired spatial footprint of the fuel source adapter 200. In addition, different velocity stacks may have different shaped interior surfaces (e.g., different degrees of taper or horn shapes) that define the axial airflow passage 230. Thus, different velocity stacks 220 may be defined by the desired air flow. In some examples, the fuel source adapter 200 may be provided as a kit that includes multiple velocity stacks 220 having various lengths and/or thickness to adapt the fuel source adapter 200 to various types of alternate fuel sources. For instance, the velocity stack includes a first velocity stack 220 having a first length and a second velocity stack 220 having a second length and the first velocity stack 220 and the second velocity stack 220 are interchangeable such that the first velocity stack 220 be removed from the spacer plate 210 and replaced with the second velocity stack 220. Each of the velocity stacks provided in the kit have substantially the same sized and shaped collar 237 at the base portion to interchangeably engage the same recessed area at the interior surface of the spacer plate 214.

As shown in FIG. 11, the velocity stack 220 may also include an aperture 235 at a base portion of the sidewall to interconnect the axial airflow passage 230 defined by the velocity stack 220 with the flow of alternative fuel. The aperture 235 may be defined at any location along the length of the velocity stack so as to circumscribe and interconnect with the opening at the interior surface of the spacer plate 214 that leads to the transverse fuel inlet 132. The aperture 235 may be generally oval shaped as shown in FIG. 11, however, other shapes are been contemplated as well as cutout shapes that open into the bottom edge of the collar. As described above, the collar 237 may include notched portions which may help a user align the transverse fuel inlet 132 with the aperture 235 to allow unencumbered flow therethrough.

Figure 10A:
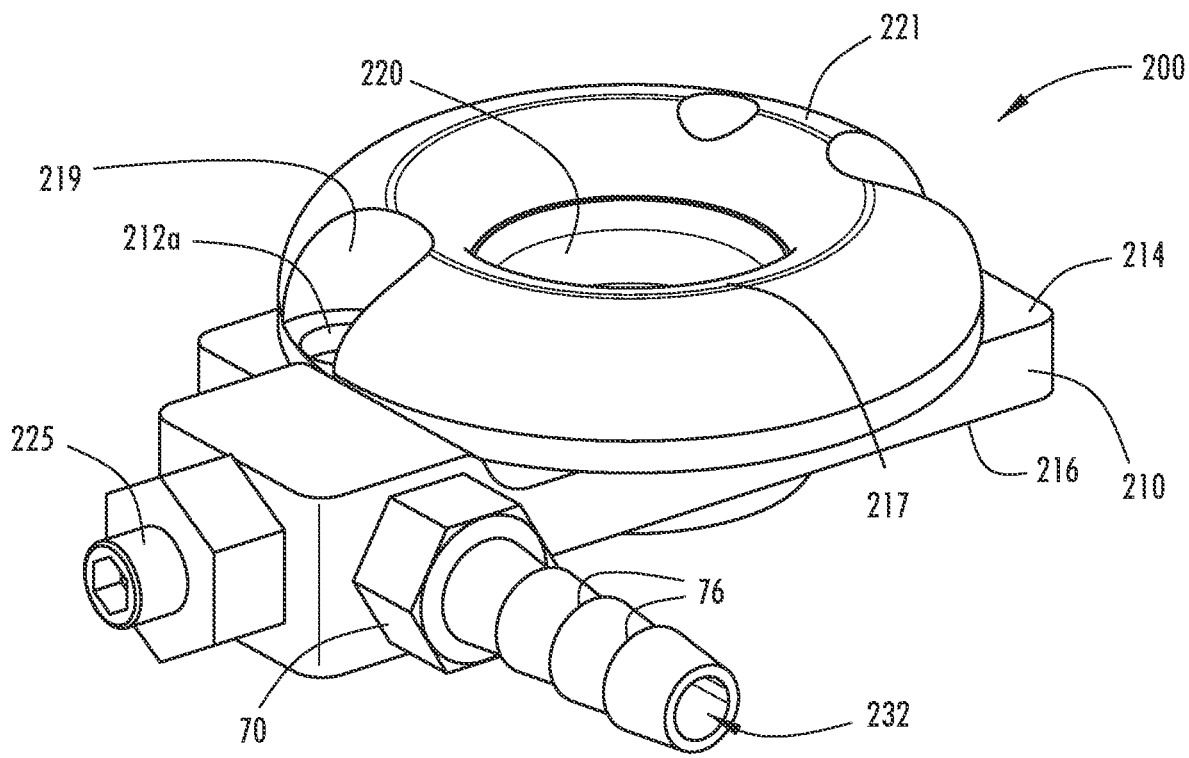
FIGS. 10A and 10B are perspective views of the fuel source adapter.
Figure 10B:
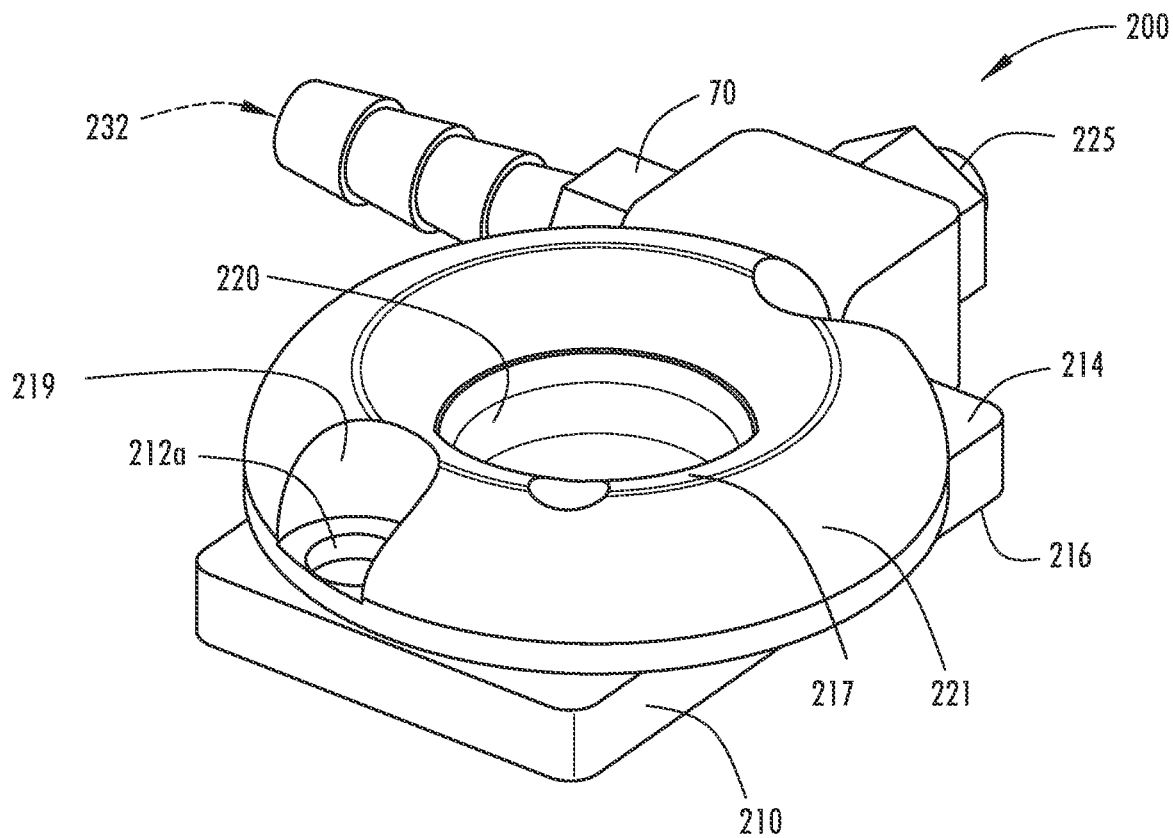

Referring now to FIGS. 10A-10B, the fuel source adapter 200 is shown having a velocity stack 220 extending from the air intake-facing surface 214 of the fuel source adapter 200. The velocity stack 220 extends about the perimeter of the axial airflow passage 230 and is configured to receive airflow from an air intake manifold 20 (FIG. 15B). It is contemplated that the velocity stack 220 may have a horn shaped opening as described above. However, it is also contemplated that the velocity stack 220 may be fitted with an air horn 221 which is disposed on the opening on the velocity stack 220. As shown in FIG. 11, the air horn 221 may be generally ring or donut shaped having a generally circular outer shape and an aperture defined therein and aligned with the opening of the velocity stack 220. The air horn 221 may also define one or more cut-outs 219 designed to allow a securing mechanism to be disposed there through to attach the air horn 221 to one or more of the velocity stack 220 or the spacer plate 220. In one example, the cut outs 219 are aligned with bolt holes 212a such that a single securing mechanism is configured to secure the air horn 221, the velocity stack 220, and the spacer plate 220. One or more of the holes may not include a cut-out 219 but may still be aligned with the bolt holes 212a to help secure the air horn 221 to the spacer plate 220. In the example where the velocity stack 220 comprises multiple velocity stacks of varying lengths, the securing mechanisms may include one or more washers designed to allow the air horn 221 to engage the spacer plate 200 regardless of the length of the velocity stack between the air horn 221 and the spacer plate 200.

Moreover, the air horn 221 may also have a rounded top surface 217 configured to smoothly direct airflow. The top surface may also help fluid flow efficiently and prevent air tumbling near the velocity stack 220 reducing the chance of inconsistent air supply to the engine. Inconsistent air supply can result in an inconsistent fuel to air mixture entering the combustion area of the engine, leading to inconsistent and undesirable performance.

Alternate fuel enters the fuel source adapter 200 through the transverse fuel inlet 232 disposed within the thickness of the spacer plate 210. As depicted, the transverse fuel inlet 232 is defined by a circular opening 234 in and extending through the spacer plate body 210. The transverse fuel inlet 232 may taper to an oval, non-circular, or irregular-shaped opening 236 at the axial airflow passage 230. The channel formed by the transverse fuel inlet 232 and the opening 236 into the axial airflow passage 230 may correspond to a particular alternate fuel source so as to provide a determined fuel to air ratio to the engine. A transverse fuel inlet 232 with a circular opening 234 can be threaded to allow for connection to a hose fitting 70.

Referring now to FIGS. 13-15A, the fuel inlet 232 is shown having a circular opening 234 disposed in and extending into the spacer plate 210. The spacer plate 210 may include fuel flow regulator or valve, such a screw valve, gate valve, or the like. In the example shown in FIGS. 13-15A, the spacer plate 210 includes a fuel flow regulator having a bolt channel 223 defined in the spaced perpendicular to the fuel inlet 232. The bolt channel 223 may be sized to fit a bolt 225 therein. The bolt 225 may act as a screw valve and be configured to adjust the amount of fuel entering the fuel inlet 232. For example, the bolt 225 may at least partially block the fuel inlet 232 such that the amount of fuel inlet is controlled. The bolt 225 may be configured to block all of the fuel inlet 232, such that no fuel enters the fuel inlet 232 or may be configured to be disposed away from the fuel inlet 232 such that fuel is free to flow through the fuel inlet 232 unencumbered. Moreover, the bolt 225 may be disposed at locations between blocked configuration and the unencumbered configuration allowing precise control of the flow of fuel through the fuel inlet 232. The bolt 225 includes a nut portion and an extension portion extending therefrom. In one example, a least a portion of the extension portion is threaded for engagement with the nut. However, it is contemplated that the extension portion may not be threaded along the entire length such that the extension portion may fit within the bolt channel 223. In one example, the nut portion may be configured to be fixed to the spacer plate 210 such that the extension portion may be rotatable with respect to the nut to control the amount of fuel into the fuel inlet 232. However, various other configurations which allow the bolt 225 to be moved to control the flow through the fuel inlet 232 have also been contemplated.

In this illustrative example, the fuel source adapter 200 is shown with a hose fitting 70. The hose fitting 70 is threadably connected to the fuel source adapter 200 at the transverse fuel inlet 232 and is configured to engage a fuel hose 18.

When operational, alternate fuel travels from an alternate fuel source 12 to the transverse fuel inlet 232 through the fuel hose 18. The fuel hose 18 may connect to a hose fitting 70 threadably coupled to the fuel source adapter 200 at the transverse fuel inlet 232. As vacuum pressure increases from the carburetor 22, airflow is pulled from the air intake manifold 20. Vacuum pressure may be increased or decreased by opening or closing the carburetor choke 26 while the engine is running. Opening the choke 26 so that it is more parallel with respect to the axial airflow passage 230 increases the engine's demand for airflow. Closing the choke 26 so that is more perpendicular with respect to the axial airflow passage 230 reduces the engine's demand for airflow. As air is pulled from the air intake manifold 20, the airflow is compressed and smoothed by the velocity stack 220 of the fuel source adapter 200. The vacuum pressure also pulls alternate fuel from the transverse fuel inlet 232 into the axial airflow passage 230. In the axial airflow passage 230, the alternate fuel mixes with the air from the air intake manifold 20 and is pulled into the carburetor 22 by the engine's vacuum pressure.

To the extent that the terms "includes," "has" or "having" or variations in form thereof are used in either the detailed description or the claims, such terms are intended to be inclusive in a manner similar to the term "comprising" as "comprising" is interpreted when employed as a transitional word in a claim.

Also for purposes of this disclosure, the terms "upper," "lower," "right," "left," "rear," "front," "vertical," "horizontal," and derivatives thereof shall relate to the orientation shown in FIG. 1. However, it is to be understood that various alternative orientations may be provided, except where expressly specified to the contrary. It is also to be understood that the specific devices and processes illustrated in the attached drawings, and described in this specification are simply exemplary embodiments of the inventive concepts defined in the appended claims. Hence, specific dimensions and other physical characteristics relating to the embodiments disclosed herein are not to be considered as limiting, unless the claims expressly state otherwise.

Changes and modifications in the specifically described embodiments may be carried out without departing from the principles of the present invention, which is intended to be limited only by the scope of the appended claims as interpreted according to the principles of patent law. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A fuel source adapter for introducing an alternate gaseous fuel source to a combustion engine, the fuel source adapter comprising:
   a spacer plate having an intake-facing surface, a combustion-facing surface opposite the intake-facing surface, and a thickness defined by a distance between the intake-facing surface and the combustion-facing surface;
   an axial airflow passage surrounded by an interior surface of the spacer plate that extends through the thickness from the intake-facing surface to the combustion-facing surface, the axial airflow passage configured to align with an intake opening of the combustion engine;
   a transverse fuel inlet having a first portion and a second portion, the first portion having a first width and extending outward from an edge of the spacer plate, the second portion having a second width and defining an inlet passage that extends within the thickness of the spacer plate to the axial airflow passage and orthogonal to the axial airflow passage, the second width narrower than the first width, and the inlet passage of the transverse fuel inlet configured to enable fluid connection to the airflow passage; and
   a velocity stack having an interior surface forming a tapered-expanding mouth and an exterior surface separate from the tapered-expanding mouth, the velocity stack extending outward and protruding from the intake-facing surface of the spacer plate about the perimeter of the axial airflow passage to form the tapered-expanding mouth,
   wherein the exterior surface of the velocity stack is configured to be spaced from and extend into an air intake to create a passage from the air intake to the tapered-expanding mouth.

2. The fuel source adapter of claim 1, wherein the axial airflow passage is a substantially cylindrical opening through the thickness of the spacer plate.

3. The fuel source adapter of claim 1, wherein the tapered-expanding mouth axially aligns with the axial airflow passage.

4. The fuel source adapter of claim 1, wherein the velocity stack extends a distance from the spacer plate adapted for smoothing airflow.

5. The fuel source adapter of claim 1, wherein the second portion of the fuel inlet comprises an interior surface that at least partially defines an opening with a non-circular cross-sectional shape that extends into the axial airflow passage.

6. The fuel source adapter of claim 5, further comprising a hose fitting configured to engage a fuel hose, wherein the interior surface of the fuel inlet comprises a threaded section configured to threadably engage the hose fitting.

7. The fuel source adapter of claim 1, further comprising a hose fitting attached to the fuel inlet, the hose fitting having a flow regulation insert that is configured to regulate the volume of gas that enters the axial airflow passage from a hose engaged with the hose fitting.

8. The fuel source adapter of claim 7, wherein flow regulation insert comprises an interior bore with a diameter that is sized to regulate the volume of gas that enters the axial airflow passage through the interior bore.

9. The fuel source adapter of claim 1, wherein the velocity stack comprises a separate piece from the spacer plate.

10. A system comprising:
    an air intake manifold configured to deliver airflow to a combustion engine;
    a carburetor having an airflow passage, the carburetor configured to receive airflow from the air intake manifold and deliver mixed air and fuel to the combustion engine;
    a fuel source adapter provided between the air intake manifold and the carburetor, the fuel source adapter comprising:
       a spacer plate having a intake-facing surface engaging the air intake manifold and a combustion-facing surface opposite the intake-facing surface engaging the carburetor,
       a velocity stack having an interior surface defining a horn shaped channel and an exterior surface extending outward from the intake-facing surface of the spacer plate, the exterior surface spaced from and extending into a void of the air intake manifold, and
       an axial airflow passage that extends through the velocity stack and the spacer plate, the axial airflow passage aligned with the airflow passage of the carburetor; and
    wherein the spacer plate comprises a transverse fuel inlet extending to the axial airflow passage, the transverse fuel inlet configured to enable a fluid connection to the axial airflow passage for a gaseous fuel to enter the carburetor,
    wherein the transverse fuel inlet includes a first portion extending outward from the edge of the spacer plate and a second portion extending through a thickness of the spacer plate, and wherein the second portion comprises a smaller cross-sectional area than the first portion.

11. The system of claim 10, wherein the spacer plate further comprises a carburetor-facing surface surrounding the axial airflow passage,
    the carburetor-facing surface configured to couple with the carburetor around the airflow passage.

12. The system of claim 10, wherein the spacer plate and the velocity stack comprise a single integral piece.

13. The system of claim 10, wherein the horn-shaped channel is aligned with the axial airflow passage.

14. The system of claim 10, wherein the velocity stack at least partially extends into the air intake manifold.

15. The system of claim 10, wherein the transverse fuel inlet comprises an interior surface at least partially defining a cylindrical opening extending into the spacer plate.

16. The system of claim 10, wherein the velocity stack comprises a separate piece from the spacer plate.

17. The system of claim 10, wherein the velocity stack comprises a first velocity stack having a first length and a second velocity stack having a second length different from the first length and the first velocity stack may be replaced with the second velocity stack such that the first velocity stack and the second velocity stack are interchangeable with one another.

18. The system of claim 10, wherein the spacer plate defines a bolt channel and the system further includes a bolt at least partially disposed within bolt channel such that the bolt is configured to adjust the amount of fuel entering the fuel inlet.

* * * * *